May 16, 1950 C. A. STOKES 2,507,580
AIR CONDUCTING UNIT FOR CARBON BLACK FURNACES
Filed July 29, 1947 2 Sheets-Sheet 1
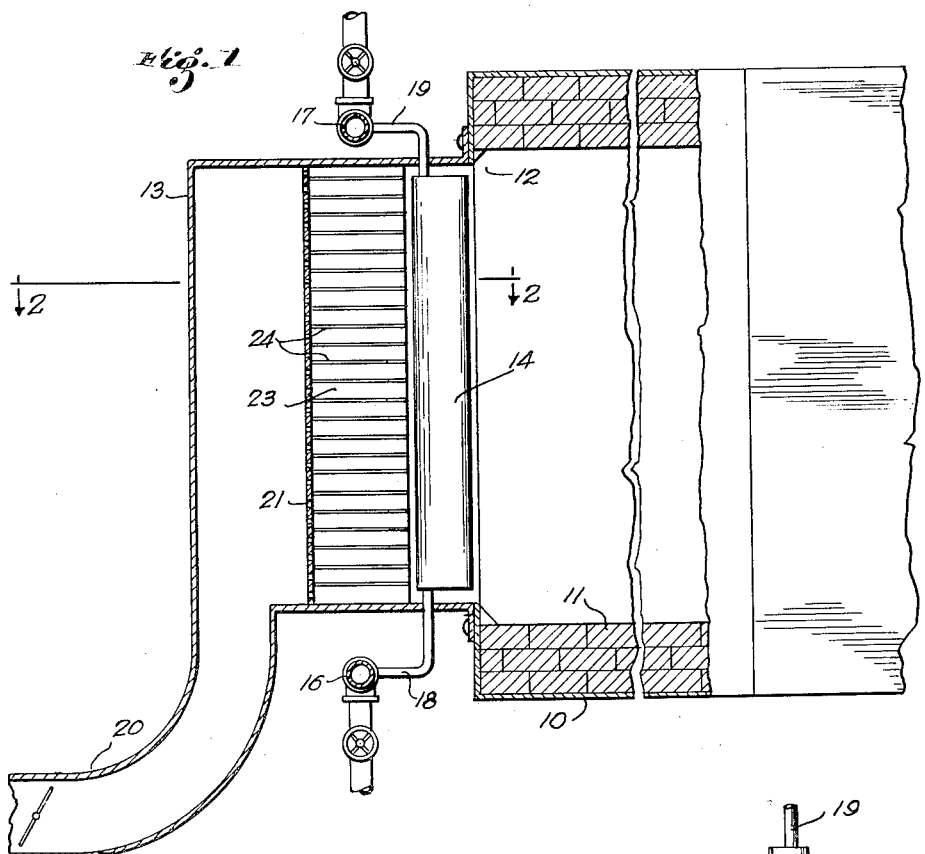
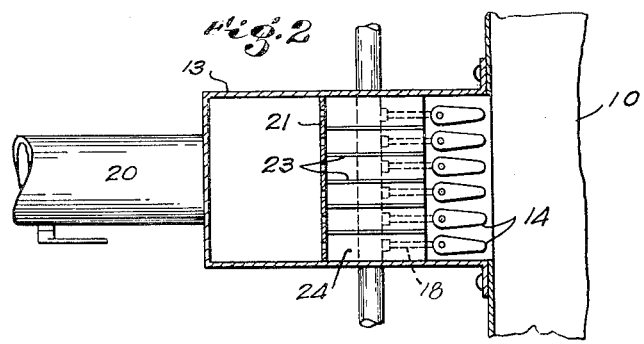
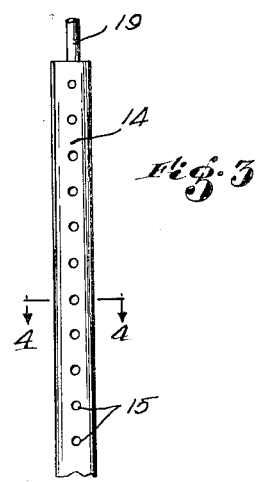
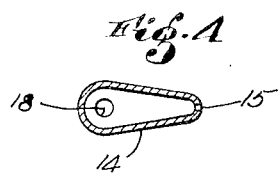
INVENTOR.
Charles A. Stokes
BY
Kenway + Witter
attys.

May 16, 1950   C. A. STOKES   2,507,580
AIR CONDUCTING UNIT FOR CARBON BLACK FURNACES
Filed July 29, 1947   2 Sheets-Sheet 2
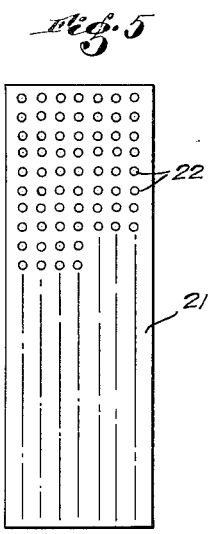
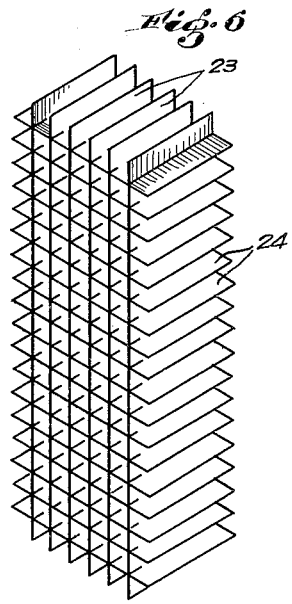
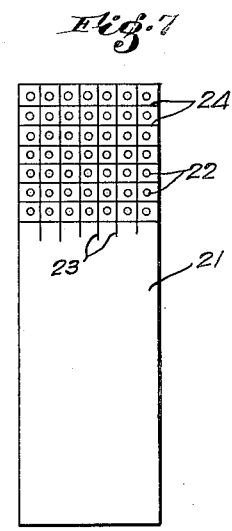
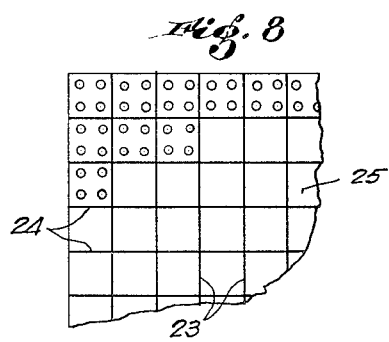

Patented May 16, 1950

2,507,580

UNITED STATES PATENT OFFICE 2,507,580

AIR CONDUCTING UNIT FOR CARBON BLACK FURNACES

Charles A. Stokes, Wellesley Hills, Mass., assignor to Godfrey L. Cabot, Inc., Boston, Mass., a corporation of Massachusetts Application July 29, 1947, Serial No. 764,277

6 Claims. (Cl. 23—259.5)

This invention relates to the production of furnace carbon black and consists in a new and improved burner construction which has been found to improve both the yield and the quality of furnace carbon black as compared with the product heretofore available.

One of the most successful furnaces in use at the present time is that disclosed in United States Letters Patent No. 2,418,475, granted April 8, 1947, on an application of William Loving. It includes in its structure a series of burner pipes spaced apart to provide air passages and each having a row of small gas orifices from which, in the aggregate, issue a multiplicity of well-distributed gas jets. Air required for partial combustion is supplied in a path passing through the spaces passing between the burner pipes. I have discovered that improved results in both yield and quality may be secured by providing in such a furnace an air conducting unit comprising a plurality of metal sheets, articulated with each other, in such a manner as to present a multiplicity of cells which distribute the air and collectively bring equal amounts of it to the individual gas orifices.

Preferably and as herein shown, the air conducting unit is associated with one or more baffle plates arranged to make a preliminary division of the body of air supplied to the burner; for example, each cell of the unit may be aligned with one or more perforations in a baffle plate and may thus serve to conduct the air from definite perforations of the baffle plate to predetermined or corresponding gas orifices in the burner pipes.

The adoption and use of the novel constuction of my invention results in an unexpected and unpredictable increase in the reinforcing properties of the resulting product, particularly in a substantial increase in the modulus of rubber compounds in which it is used.

These and other features of the invention will be best understood and appreciated from the following description of a preferred embodiment thereof, selected for purposes of illustration and shown in the accompanying drawings, in which:

Fig. 1 is a view showing a furnace partly in side elevation and partly in vertical section, Fig. 2 is a sectional view on the line 2—2 of Fig. 1, Fig. 3 is a view in elevation of one of the burner pipes, Fig. 4 is a sectional view on the line 4—4 of Fig. 3, Fig. 5 is a view in elevation of a baffle plate, Fig. 6 is a view in perspective of the air conducting unit, Fig. 7 is a fragmentary view in elevation showing the relation of the perforations in the baffle plate to the air passages of the unit, and Fig. 8 is a fragmentary view of a baffle plate having a different pattern of perforations therein.

As indicated in Fig. 1, the burner box of my invention may be used advantageously with a horizontally disposed furnace comprising a generally rectangular enclosure formed by a sheet steel casing 10 lined with refractory brick 11. An outlet duct (not shown) is provided at the right hand end of the furnace as shown in Fig. 1. In practice, the furnace may be 12 to 14 feet in length, and accordingly in Fig. 1 it is represented as having a section broken from it.

The furnace is provided at its front end with a rectangular opening 12 to receive individual burner boxes, one of which is shown in Figs. 1 and 2. Each of these comprises a sheet metal rectangular casing 13 flanged and bolted to the casing 10 of the furnace. A series of parallel vertically disposed burner pipes 14 is mounted in each burner box outside the furnace chamber. These are shown as being pear-shaped or oval in cross-section and each is provided with a row of gas orifices 15. The pipes 14 are spaced apart to provide air passages of uniform width between them and are arranged with the gas orifices 15 directed into the furnace space. In practice, the flat sides of the burner pipes 14 are spaced about ½ inch apart and their narrow faces are directed toward the furnace enclosure.

Gas is supplied to the burner pipes from a lower header 16 and an upper header 17 having individual connections 18 and 19 to the top and bottom of the burner pipes. As herein shown, each burner box is equipped with six burner pipes, but the precise number of pipes employed is of secondary importance. The gas orifices are in the order of ¼ inch in diameter and may be spaced 1 inch on centers so that a 3 foot burner pipe may be provided with about thirty-three orifices and in the aggregate each burner box may present 198 well-distributed orifices.

Air is supplied to the burner box by a duct 20 which leads upwardly into the chamber provided by the casing 13 and may be provided with a controlling damper. The casing 13 is provided with a transverse baffle plate 21 having perforations 22 which, as shown in Fig. 5, are arranged in vertical rows and may correspond in location to the gas orifices of the burner pipes. The construction above described is well known and has been widely used heretofore in the carbon black industry as described, for example, in Patent No. 2,418,475 above identified.

The air conducting unit of my invention will now be described in the best form now known to me and in which form it greatly improves the value of all carbon black furnaces in which it has been incorporated. Its general construction is best shown in Fig. 6 and its location with respect to the furnace in Fig. 1. As therein shown, it is located between the baffle plate 21 and the burner pipes 14. This comprises a series of rectangular vertical sheets 23 of steel corresponding in number to the burner pipes, and a series of horizontal sheets 24 of steel corresponding to the number of gas orifices. The sheets 23 and 24 are slotted half way from one edge to the other and brought into interlocking engagement with each other so that their opposite edges lie in common parallel planes and the plates themselves define a nest of rectangular air passages or cells of equal dimensions. The plates may be permanently retained in assembled position by spot welding. The assembly may be then placed as a unit within the casing 13 and retained in position by spot welding. The relation of these cells or air passages to the perforations of the baffle plate 21 is well shown in Fig. 7, and it will be understood that each perforation 22 of the baffle plate and each passage of the air conducting unit is aligned with one of the gas orifices 15 of a burner pipe.

In Fig. 8 is suggested an alternative form of baffle plate 25 having its perforations arranged in groups of four, that is to say, instead of a single perforation corresponding to a single air passage in the conducting unit, the baffle plate has four smaller perforations arranged within the outline of each air passage. It will be understood that various other arrangements of perforation may be made according to different operating conditions, but in general the purpose of the organization is to provide a structure which will preliminarily break up the full air current in the chamber of the casing 13 into streams of equal volume and conduct these streams to the corresponding gas orifices, thus insuring that all the gas jets shall receive an equal amount of air regardless of the position of any individual jet in the field.

The burner box above described has been operated over a range of gas rates from 3000 c. f. h. to 5000 c. f. h. The general results are indicated in the series of runs listed as follows:

*M-burner 3000 c. f. h. gas flow*

| Run | Scale | Per Cent of Standard | | |
|---|---|---|---|---|
| | | Tensile | Modulus | |
| | | | 300 | 400 |
| WITHOUT AIR CONDUCTING UNIT | | | | |
| 1150 | 96.4 | 98 | 100 | 95 |
| 1152 | 94.5 | 101 | 102 | 97 |
| 1153 | 93.0 | 101 | 98 | 93 |
| WITH AIR CONDUCTING UNIT | | | | |
| 1178 | 96.0 | 99 | 119 | 112 |
| 1177 | 94.4 | 101 | 121 | 115 |
| 1176 | 94.0 | 104 | 110 | 106 |

*M-burner 4000 c. f. h. gas flow*

| Run | Scale | Per Cent of Standard | | |
|---|---|---|---|---|
| | | Tensile | Modulus | |
| | | | 300 | 400 |
| WITHOUT AIR CONDUCTING UNIT | | | | |
| 1218 | 94.2 | 101 | 98 | 100 |
| 1220 | 95.1 | 110 | 117 | 107 |
| WITH AIR CONDUCTING UNIT | | | | |
| 1233 | 94.1 | 102 | 126 | 115 |
| 1234 | 95.1 | 105 | 132 | 123 |

*M-burner 5000 c. f. h. gas flow*

| Run | Scale | Per Cent of Standard | | |
|---|---|---|---|---|
| | | Tensile | Modulus | |
| | | | 300 | 400 |
| WITHOUT AIR CONDUCTING UNIT | | | | |
| 1223 | 95.0 | 113 | 115 | 106 |
| 1222 | 93.5 | 117 | 98 | 94 |
| WITH AIR CONDUCTING UNIT | | | | |
| 1229 | 94.7 | 112 | 124 | 116 |
| 1228 | 93.2 | 108 | 129 | 123 |

It will be noted that in all runs where the air conducting unit was used, the rubber reinforcing properties of the product was decidedly improved as shown by the modulus at 300 and 400% elongation appearing in the last two columns of the table. In addition to the improvement in the quality of the product above noted, the employment of the air conducting unit noticeably increases the yield of carbon black and improves the furnace operating conditions by eliminating coking in the furnace.

Having thus disclosed my invention and described in detail specific embodiments thereof, I claim as new and desire to secure by Letters Patent:

1. An air conducting unit for a carbon black furnace equipped with a series of spaced parallel burner pipes located outside the furnace and providing air passages between them and each having a row of gas orifices directed into the furnace, and an air chamber leading to the burner pipes containing a transversely disposed perforated baffle plate; the unit comprising a multiplicity of sheet metal partitions interlocked and providing a nest of rectangular air passages between the baffle plate and the burner pipes and located at the opposite side of the burner pipes from the furnace, said air passages being in alignment with the perforations of the said baffle plate.

2. An air conducting unit for a carbon black furnace equipped with a series of spaced parallel burner pipes located outside the furnace and providing elongated air passages between them and each having a row of gas orifices directed into the furnace, and an air chamber leading to the burner pipes containing a baffle plate having perforations bearing a predetermined relation to the gas orifices; the unit comprising a plurality of sheet metal partitions intersecting at right angles and providing a plurality of rows of parallel air passages in said chamber and located at the opposite side of the burner pipes from the furnace, said air passages being in alignment with the perforations of the said baffle plate.

3. An air conducting unit for a carbon black furnace equipped with a predetermined number of spaced vertical parallel burner pipes located outside the furnace and defining intermediate air passages and each having a row of burner orifices, and an air chamber leading to the burner pipes and containing a baffle plate housing corresponding rows of perforations; the unit comprising vertical partitions corresponding in number to the burner pipes, and intersecting horizontal partitions providing therewith air passages in the chamber located at the opposite side of the burner pipes from the furnace, said air passages being in alignment with the porforations of the said baffle plate.

4. In a carbon black furnace having pipes presenting a multiplicity of small well-distributed gas orifices, and an air duct leading toward said orifices and containing a perforated baffle plate; a self-contained air conducting unit fitting within the air duct and comprising a plurality of flat metal sheets slotted and interlocked with each other with their opposite end edges in parallel common planes and in such a manner as to present a multiplicity of equal rectangular cells, each cell being aligned with predetermined gas orifices and with certain perforations of the baffle plate.

5. An air conducting unit for a carbon black furnace equipped with a series of spaced parallel burner pipes each having a row of spaced gas orifices, and an air duct leading to said pipes and containing a perforated baffle plate; the unit fitting within said air duct and comprising a series of long rectangular metal sheets corresponding in number to the number of burner pipes, and a series of short rectangular metal sheets bearing a predetermined relation to the number of gas orifices, both series of sheets being slotted and interlocked and forming with the duct a multiplicity of gas passages respectively associated with specific gas orifices of the burner pipes and aligned with the perforations of said baffle plate.

6. An air conducting unit for a carbon black furnace equipped with a series of spaced parallel burner pipes providing intermediate air passages and each having a row of spaced gas orifices, an air duct leading to said passages, and a baffle plate located in the air duct and having a perforation corresponding to each gas orifice; the air conducting unit comprising intersecting partitions located between said baffle plate and the burner pipes and defining an air passage behind each perforation of the baffle plate.

CHARLES A. STOKES.

REFERENCES CITED

The following references are of record in the file of this patent:

UNITED STATES PATENTS

| Number | Name | Date |
|---|---|---|
| 1,950,015 | Winder et al. | Mar. 6, 1934 |
| 1,950,046 | Cone | Mar. 6, 1934 |
| 1,999,541 | Keller | Apr. 30, 1935 |
| 2,418,475 | Loving | Apr. 8, 1947 |